United States Patent
Xiao

(10) Patent No.: US 9,984,328 B2
(45) Date of Patent: May 29, 2018

(54) SYSTEM, APPARATUS AND METHOD FOR RECOMMENDING THESAURUS IN INPUT METHOD

(71) Applicant: Shenzhen Shi Ji Guang Su Information Technology Co., Ltd., Shenzhen (CN)

(72) Inventor: Jinghui Xiao, Shenzhen (CN)

(73) Assignee: Shenzhen Shi Ji Guang Su Information Technology Co., Ltd., Shenzhen (CN)

( * ) Notice: Subject to any disclaimer, the term of this patent is extended or adjusted under 35 U.S.C. 154(b) by 853 days.

(21) Appl. No.: 14/530,276

(22) Filed: Oct. 31, 2014

(65) Prior Publication Data
US 2015/0052096 A1 Feb. 19, 2015

Related U.S. Application Data

(63) Continuation of application No. PCT/CN2013/075216, filed on May 6, 2013.

(30) Foreign Application Priority Data

May 8, 2012 (CN) .......................... 2012 1 0139608

(51) Int. Cl.
*G06F 7/00* (2006.01)
*G06F 17/30* (2006.01)
(Continued)

(52) U.S. Cl.
CPC ......... *G06N 5/027* (2013.01); *G06F 17/3064* (2013.01); *G06F 17/30737* (2013.01); *G06F 17/30867* (2013.01); *G06N 7/00* (2013.01)

(58) Field of Classification Search
CPC ................................ G06N 5/027; G06N 7/00
(Continued)

(56) References Cited

U.S. PATENT DOCUMENTS

2003/0145326 A1* 7/2003 Gutta ................. H04N 5/44543
725/46
2004/0172612 A1* 9/2004 Kasravi ..................... G06F 8/36
717/101
(Continued)

FOREIGN PATENT DOCUMENTS

CN 101051323 A 10/2007
CN 101645087 A 2/2010
(Continued)

OTHER PUBLICATIONS

"Microsoft Word 2010 Inside Out", Oct. 8, 2010.*
(Continued)

*Primary Examiner* — Binh V Ho
(74) *Attorney, Agent, or Firm* — Wolf, Greenfield & Sacks, P.C.

(57) ABSTRACT

A system, an apparatus and a method for recommending a thesaurus in an input method are provided. A thesaurus selecting unit is set on the network side to obtain a personal information of a user through the Internet; in a thesaurus set unit, one or more thesauruses are determined as matching the personal information of the user; and the determined thesauruses are sent to a terminal currently used by the user so that the thesaurus is available for being installed on the terminal currently used by the user. Further, before the thesauruses are sent to the terminal currently used by the user, under a condition that there are at least two determined thesauruses that match the personal information of the user, the determined thesauruses are sorted to obtain a list of thesauruses, where thesauruses in the list are sent to the terminal currently used by the user.

11 Claims, 2 Drawing Sheets

(51) Int. Cl.
*G06N 5/02* (2006.01)
*G06N 7/00* (2006.01)

(58) Field of Classification Search
USPC .......................................................... 707/705
See application file for complete search history.

(56) References Cited

U.S. PATENT DOCUMENTS

| | | | |
|---|---|---|---|
| 2004/0192440 A1* | 9/2004 | Evans .................... | A63F 13/12 463/30 |
| 2005/0050175 A1* | 3/2005 | Fong ................... | G06F 9/44505 709/220 |
| 2005/0289134 A1 | 12/2005 | Noguchi | |
| 2006/0031529 A1* | 2/2006 | Keith, Jr. ............ | H04L 67/1095 709/227 |
| 2006/0290965 A1* | 12/2006 | Sugai .................... | G06F 3/1204 358/1.13 |
| 2007/0204338 A1* | 8/2007 | Aiello .................... | H04L 43/16 726/11 |
| 2007/0288266 A1* | 12/2007 | Sysko ................... | G06Q 10/00 705/2 |
| 2008/0301660 A1* | 12/2008 | Rao ........................ | G06F 8/65 717/170 |
| 2009/0106752 A1* | 4/2009 | Balu ........................ | G06F 8/61 717/176 |
| 2017/0244710 A1* | 8/2017 | Hopen ................... | H04L 63/10 |

FOREIGN PATENT DOCUMENTS

| | | |
|---|---|---|
| CN | 101645088 A | 2/2010 |
| JP | 2000222410 A | 8/2000 |
| JP | 2000348042 A | 12/2000 |
| JP | 2002183126 A | 6/2002 |
| JP | 2005352874 A | 12/2005 |
| JP | 2006011739 A | 1/2006 |
| JP | 2007226467 A | 9/2007 |
| JP | 2008117163 A | 5/2008 |
| JP | 2010039847 A | 2/2010 |

OTHER PUBLICATIONS

Japanese Office Action, dated Oct. 5, 2015, from corresponding or related Japanese Patent Application No. 2015506088.
International Search Report dated Aug. 15, 2013 from corresponding International Application No. PCT/CN2013/075216.

* cited by examiner

# SYSTEM, APPARATUS AND METHOD FOR RECOMMENDING THESAURUS IN INPUT METHOD

CROSS-REFERENCE TO RELATED APPLICATIONS

This application claims priority and is a continuation of PCT/CN2013/075216, filed on May 6, 2013, and entitled "SYSTEM, APPARATUS AND METHOD FOR RECOMMENDING THESAURUS IN INPUT METHOD", which claims the priority to Chinese Patent Application No. 2012101396083, filed with the Chinese Patent Office on May 8, 2012 and entitled "SYSTEM, APPARATUS AND METHOD FOR RECOMMENDING THESAURUS IN INPUT METHOD", the contents of which are incorporated by reference in their entireties.

FIELD OF THE TECHNOLOGY

The present invention relates to the technical field of computer input methods, and in particular, to a system, an apparatus, and a method for recommending a thesaurus in an input method.

BACKGROUND OF THE INVENTION

With development of computers, various input methods are available for inputting instructions or texts. A user just needs to install and run a type of input method program to input instructions or texts through the installed input method program. When installing the input method program, a corresponding basic vocabulary needs to be stored in a computer so that an input instruction or text can be invoked from the stored basic vocabulary through the input method program. The basic vocabulary includes language models of words, expressions and sentences, and is a result of massive training and statistics of corpuses. When installing the input method program, a thesaurus can also be installed on the computer to supplement the words, expressions and sentences in the basic vocabulary. Different thesauruses are provided for different professional fields. A thesaurus is a set of expressions specific to a field, a geographic area or an application scenario, for example, a city place name thesaurus, a common Chinese idiom thesaurus, or a game thesaurus. When the user inputs texts in a specific field, specific geographic area or specific application scenario, for example, during playing a game, a game thesaurus that includes special game terms can be stored in the computer. When an input is made through the input method program, the input method program can not only invoke the basic vocabulary, but also invoke the special game terms in the game thesaurus, so that the user has an experience of more accurate input.

Currently, a process of storing a thesaurus in a terminal used by the user such as a computer or mobile terminal is: according to the current usage habits of the user, or the specific field, or the specific geographic area or the specific application scenario, the terminal determines a type of thesaurus to be used; and then the terminal gets connected to an Internet-side server that provides the determined thesaurus, downloads the determined thesaurus from the server, and installs it locally.

However, the above process for installing the thesaurus in the terminal used by the user brings two defects. The first defect is: the process is very complicated to the user, and requires the user to stop the current input process and then install the thesaurus according to the foregoing process, which deteriorates the input experience of the user. The second defect is: the installation of the thesaurus on the terminal in this process requires the user to have certain computer skills such as Internet search and download capabilities, which imposes difficulties to ordinary users.

Overall, installing a thesaurus on a user terminal in the foregoing process is troublesome and hardly implementable to ordinary users, and brings poor experience to the users.

SUMMARY OF THE INVENTION

Therefore, an aspect of the present invention provides a system for recommending a thesaurus in an input method. The system installs the thesaurus on a terminal, which is simple and easy to implement and improves user experience.

Further, another aspect of the present invention provides an apparatus for recommending a thesaurus in an input method. The apparatus installs the thesaurus on a terminal, which is simple and easy to implement and improves user experience.

Further, another aspect of the present invention provides a method for recommending a thesaurus in an input method. The method installs the thesaurus on a terminal, which is simple and easy to implement and improves user experience.

To achieve the foregoing objectives, the technical solutions of the present invention are implemented in the following way:

A system for recommending a thesaurus in an input method is provided. The system includes: a thesaurus set unit and a thesaurus selecting unit which are located on a network side, and a terminal which is currently used by a user and located on a terminal side.

The thesaurus set unit is configured to store multiple different thesauruses.

The thesaurus selecting unit is configured to obtain a personal information of the user through the Internet from the terminal currently used by the user, determine one or more thesauruses which match the personal information of the user from the thesaurus set unit, and send the determined thesauruses to the terminal currently used by the user so that the thesauruses are available for being installed on the terminal currently used by the user.

The terminal currently used by the user is configured to store the personal information of the user, and install the thesauruses sent from the thesaurus selecting unit.

An apparatus for recommending a thesaurus in an input method is provided. The apparatus includes: a rule-based thesaurus recommender, a content-based thesaurus recommender, and a thesaurus sorter.

The rule-based thesaurus recommender is configured to determine one or more thesauruses which match a personal information of a user from a thesaurus set unit according to a current registration information of the user and a current status information of the user that are obtained through the Internet from a terminal currently used by the user, and send the determined thesauruses to the thesaurus sorter.

The content-based thesaurus recommender is configured to determine one or more thesauruses which match the personal information of the user from the thesaurus set unit according to an input habit information of the user obtained from a personal thesaurus of the user, and send the determined thesauruses to the thesaurus sorter.

The thesaurus sorter is configured to receive the determined thesauruses sent from the rule-based thesaurus recommender and the content-based thesaurus recommender respectively, sort the thesauruses according to set rules to obtain a list of thesauruses, and send thesauruses in the list of thesauruses to the terminal currently used by the user.

A method for recommending a thesaurus in an input method is provided. The method includes:

obtaining a personal information of a user through the Internet from a terminal currently used by the user;

determining one or more thesauruses which match the personal information of the user from a thesaurus set unit; and sending the determined thesauruses to the terminal currently used by the user so that the thesauruses are available for being installed on the terminal currently used by the user.

As revealed in the foregoing technical solution, in the present invention, the thesaurus selecting unit is set on the network side to obtain the personal information of the user through the Internet; in the thesaurus set unit, one or more thesauruses are determined as matching the personal information of the user; and the determined thesauruses are sent to the terminal currently used by the user so that the thesauruses are available for being installed on the terminal currently used by the user. Further, before the thesauruses are sent to the terminal currently used by the user, under a condition that there are at least two determined thesauruses that match the personal information of the user, the determined thesauruses are sorted to obtain a list of thesauruses, where the thesauruses in the list are sent to the terminal currently used by the user. In this way, unlike the prior art, it can be avoided that the user has to set up a link between the currently used terminal and an network-side server to provide the determined thesauruses, the determined thesauruses are downloaded from the server and then installed onto the terminal locally. Instead, in the present invention, the thesaurus selecting unit set on the network side determines a list of thesauruses to be used by the user, and the thesauruses are sent to the terminal currently used by the user, without requiring the user to perform complicated operations or have computer skills. Installing thesauruses on the terminal is simple and easy to implement, which improves user experience.

DETAILED DESCRIPTION OF THE EMBODIMENTS

To make the objectives, technical solutions and advantages of the present invention clearer, the following describes the present invention in more detail with reference to accompanying drawings and specific embodiments.

To avoid requirements of complicated operations and computer skills of a user when installing a thesaurus on a terminal currently used by the user, in the present invention, a thesaurus selecting unit is set on a network side to obtain a personal information of the user through the Internet, determine a thesaurus that matches the personal information of the user in a thesaurus set, and send the determined thesaurus to the terminal currently used by the user so that the thesaurus is available for being installed on the terminal currently used by the user. Further, under a condition that there are at least two thesauruses which match the personal information of the user, before the thesauruses are sent to the terminal currently used by the user, the determined thesauruses are sorted to obtain a list of thesauruses, and then the thesauruses in the list are sent to the terminal currently used by the user.

In this way, in the embodiments of the present invention, it is simple and easy to install thesauruses on the terminal, which improves user experience.

Figure 1:
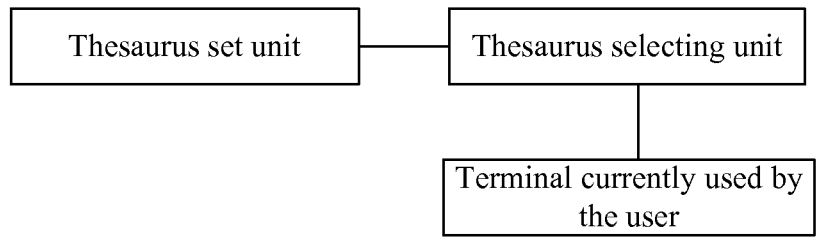
FIG. 1 is a schematic structural diagram of a system for recommending a thesaurus in an input method according to an embodiment of the present invention.

FIG. 1 is a schematic structural diagram of a system for recommending a thesaurus in an input method according to an embodiment of the present invention. The system includes: a thesaurus set unit and a thesaurus selecting unit which are located on a network side, and a terminal that is currently used by a user and located on a terminal side.

The thesaurus set unit is configured to store multiple different thesauruses.

The thesaurus selecting unit is configured to obtain a personal information of the user through the Internet from the terminal currently used by the user, determine one or more thesauruses that match the personal information of the user from the thesaurus set unit, and send the determined thesauruses to the terminal currently used by the user so that the thesauruses are available for being installed on the terminal currently used by the user.

The terminal currently used by the user is configured to store the personal information of the user, and install the thesauruses sent from the thesaurus selecting unit.

In the structure, the thesaurus selecting unit is further configured to: before the thesaurus is sent to the terminal currently used by the user, under a condition that there are at least two determined thesauruses that match the personal information of the user, sort the determined thesauruses to obtain a list of thesauruses, and send thesauruses in the list of thesauruses to the terminal currently used by the user.

In the structure, the thesaurus selecting unit includes a thesaurus recommender and a thesaurus sorter, where the thesaurus recommender includes a rule-based thesaurus recommender and/or a content-based thesaurus recommender; and the thesaurus sorter is configured to sort the determined thesauruses according to a match program.

Figure 2:
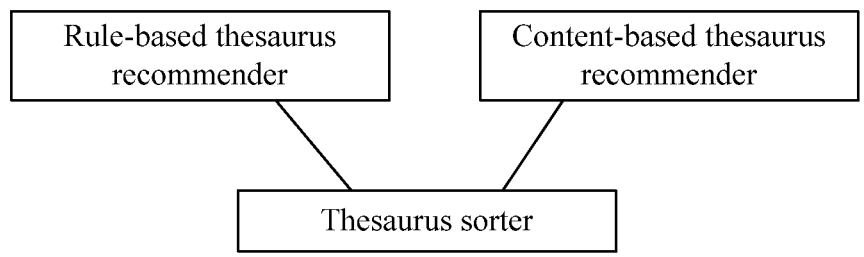
FIG. 2 is a schematic structural diagram of an apparatus for recommending a thesaurus in an input method according to an embodiment of the present invention.

FIG. 2 is a schematic structural diagram of an apparatus for recommending a thesaurus in an input method according to an embodiment of the present invention. The apparatus includes: a rule-based thesaurus recommender, a content-based thesaurus recommender, and a thesaurus sorter.

The rule-based thesaurus recommender is configured to determine one or more thesauruses that match from a thesaurus set unit according to a current registration information of a user and a current status information of the user that are obtained through the Internet from a terminal currently used by the user, and send the determined thesauruses to the thesaurus sorter;

The content-based thesaurus recommender is configured to determine one or more thesauruses which match the personal information of the user from the thesaurus set unit according to input habit information of the user obtained from a personal thesaurus of the user, and send the determined thesauruses to the thesaurus sorter, where the personal thesaurus of the user may be located on the terminal currently used by the user on the terminal side or located on the network side, but preferably on the terminal side.

The thesaurus sorter is configured to receive the determined thesauruses sent from the rule-based thesaurus recommender and the content-based thesaurus recommender respectively, sort the thesauruses according to set rules to obtain a list of thesauruses, and send thesauruses in the list of thesauruses to the terminal currently used by the user.

The following gives detailed description about the rule-based thesaurus recommender, the content-based thesaurus recommender, and the thesaurus sorter.

Rule-Based Thesaurus Recommender

The rule-based thesaurus recommender is configured to determine one or more thesauruses which match the personal information of the user from the thesaurus set unit according to the current registration information and the current status information in the personal information of the user by using set rules.

Here the current registration information is an information that is input when the user gets registered onto the terminal currently used by the user, for example, a user address and/or user gender and age; and the current status information is a current Internet link information of the user, such as an address of the terminal currently used by the user. The set rules are set condition rules. For example, a condition rule is: when the current registration information includes an address, a thesaurus corresponding to this address is determined. Here is a specific example: a condition rule is set as: when the current registration information includes a university, a thesaurus of the university corresponding to an address of the university is determined.

Figure 3:
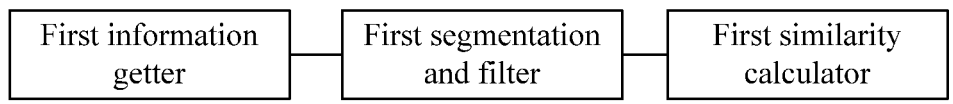
FIG. 3 is a schematic structural diagram of a rule-based thesaurus recommender according to an embodiment of the present invention.

FIG. 3 is a schematic structural diagram of a rule-based thesaurus recommender according to an embodiment of the present invention. The rule-based thesaurus recommender includes a first information getter, a first segmentation and filter, and a first similarity calculator.

The first information getter is configured to obtain current registration information of a user and a current status information of the user through the Internet from a terminal currently used by the user to obtain a user information description text, and send the user information description text to the first segmentation and filter; and obtain a thesaurus information description text stored in the thesaurus set unit from the thesaurus set unit, and send the thesaurus information description text to the first segmentation and filter;

The first segmentation and filter is configured to segment words in the user information description text, filter out stop words, form a user information keyword set, and send the user information keyword set to the first similarity calculator; segment words in the thesaurus information description text, filter out stop words, form a thesaurus information keyword set, and send the thesaurus information keyword set to the first similarity calculator; and The first similarity calculator is configured to: calculate a similarity between the user information keyword set and the thesaurus information keyword set; and, if the similarity between a user information keyword in the user information keyword set and a thesaurus information keyword in the thesaurus information keyword set is greater than a set first similarity threshold, determine that a thesaurus corresponding to the thesaurus information keyword is the thesaurus which matches the personal information of the user so that the thesaurus is obtained from the thesaurus set unit.

In the structure, the first segmentation and filter segments words in the user information description text. For example, the user information description text is "undergraduate studying at Harbin Institute of Technology", which is segmented into "undergraduate/studying/at/Harbin/Institute/of/Technology". Stop words are filtered out of the segmented words to form a user information keyword set: "undergraduate, Harbin, Institute, Technology".

In the structure, the stop words are the words that are not much helpful for predicting user input habits, and verbs and colloquial words may be set as the stop words. Correspondingly, the first segmentation and filter segments words in the thesaurus information description text, filters out the stop words, and forms the thesaurus information keyword set in a similar way.

In the structure, the first similarity threshold is set empirically.

In the structure, the first similarity calculator is a key component, and is configured to calculate the similarity between the user information keyword set and the thesaurus information keyword set by using formula (1):

$$L_{ud} = \frac{S_u \cap S_d}{S_u \cup S_d} \quad (1)$$

In the formula (1), $L_{ud}$ represents a similarity value between the user information keyword set and the thesaurus information keyword set, and is a ratio of an intersection $S_u \cap S_d$ to a union $S_u \cup S_d$, where the intersection is an intersection of the user information keyword set and the thesaurus information keyword set, and the union is a union of the user information keyword set and the thesaurus information keyword set.

Other calculation methods may be applied instead. For example, the similarity is calculated by counting how many steps are enough for changing a user information keyword into a thesaurus information keyword, which is covered in the prior art and is not repeated here any further.

Calculating similarity between the user information keyword set and the thesaurus information keyword set is a double traversal process, which refers to calculating similarity for each user information keyword in the user information keyword set and each thesaurus information keyword in the thesaurus information keyword set to find the matching thesaurus.

The advantages of the rule-based thesaurus recommender are fast and accurate recommendation, but the disadvantage is that the available personal information of the user is limited.

Content-Based Thesaurus Recommender

The content-based thesaurus recommender finds one or more thesauruses which match the personal information of the user from the thesaurus set unit according to the input habit information in the personal information of the user, where the input habit information is obtained from the personal thesaurus of the user, and the personal thesaurus stores entries input by the user by using an input method. The personal thesaurus reflects the user's input habit, and the entries input by the user in a period reflect the user's real-time input interest and input requirements in the period.

The content-based thesaurus recommender makes up for the limitation of obtaining the personal information of the user. Because mining and calculation of contents are generally based on a statistics method, the content-based thesaurus recommender is usually called a statistics-based thesaurus recommender.

Figure 4:
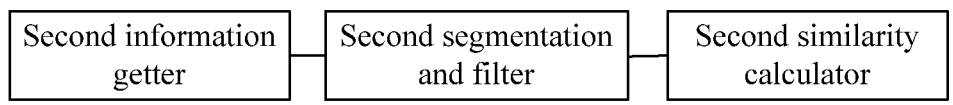
FIG. 4 is a schematic structural diagram of a content-based thesaurus recommender according to an embodiment of the present invention.

FIG. 4 is a schematic structural diagram of a content-based thesaurus recommender according to an embodiment of the present invention. The content-based thesaurus recommender includes a second information getter, a second segmentation and filter, and a second similarity calculator.

The second information getter is configured to obtain the input habit information from the personal thesaurus of the user, and send the input habit information to the second segmentation and filter; and obtain a thesaurus information description text stored in the thesaurus set unit from the thesaurus set unit, and send the thesaurus information description text to the second segmentation and filter;

The second segmentation and filter is configured to segment words in the input habit information, filter out stop words, form an input habit information keyword set, and send the input habit information keyword set to the second similarity calculator; segment words in the thesaurus information description text, filter out stop words, form a thesaurus information keyword set, and send the thesaurus information keyword set to the second similarity calculator; and The second similarity calculator is configured to: calculate similarity between the input habit information keyword set and the thesaurus information keyword set; and, if the similarity between an input habit information keyword in the input habit information keyword set and a thesaurus information keyword in the thesaurus information keyword set is greater than a set second similarity threshold, determine that a thesaurus corresponding to the thesaurus information keyword is a matching thesaurus so that the thesaurus is obtained from the thesaurus set unit.

The working process of the structure shown in FIG. 4 is similar to the working process of the structure shown in FIG. 3, but differs in: 1. the personal information of the user obtained respectively by the structures shown in FIG. 3 and FIG. 4 are different from each other, that is, the structure shown in FIG. 3 obtains the current registration information and the current status information of the user, but the structure shown in FIG. 4 obtains the input habit information; and 2. the implementation modes of similarity calculation thereof are different, that is, the input habit information keyword includes both entry information and word frequency information, but the user information keyword includes only entry information. The word frequency information helps to calculate the extent of matching between the personal information of the user and the thesaurus more accurately, which, however, is complicated to implement.

If the word frequency information of the input habit information keyword is ignored, formula (1) may be used to calculate similarity between the input habit information keyword set and the thesaurus information keyword set, that is, the value of similarity between the input habit information keyword set and the thesaurus information keyword set is a ratio of an intersection to a union, where the intersection is an intersection of the input habit information keyword set and the thesaurus information keyword set, and the union is a union of the input habit information keyword set and the thesaurus information keyword set. The difference is: it is not a user information keyword set, but an input habit information keyword set.

If the word frequency information of the input habit information keyword is taken into account, the similarity between the input habit information keyword set and the thesaurus information keyword set may be calculated in two modes:

The first mode is to calculate the similarity using formula (2):

$$L_{ud} = \frac{C_{S_u} \cap S_d}{C_{S_u} \cup S_d} \qquad (2)$$

That is a ratio of a total word frequency in an intersection to a total word frequency in a union, where the intersection is an intersection of the input habit information keyword set and the thesaurus information keyword set, and the union is a union of the input habit information keyword set and the thesaurus information keyword set.

The numerator in formula (2) may be obtained using formula (3):

$$C_{S_u} \cap S_d = \sum_{w \in S_u \cap S_d} C_{S_u}(w) + \sum_{w \in S_u \cap S_d} C_{S_d}(w) \qquad (3)$$

where $w \in S_u \cap S_d$ represents a word entry that appears in both the input habit information keyword set and the thesaurus information keyword set, and $C_s$ represents word frequency information of the word entry;

Correspondingly, the denominator in formula (2) may be obtained using formula (4):

$$C_{S_u} \cup S_d = \sum_{w \in S_u \cup S_d} C_{S_u}(w) + \sum_{w \in S_u \cup S_d} C_{S_d}(w). \qquad (4)$$

The second mode is to calculate the similarity using a vector space model. The vector space model considers a word set as a vector, and different words constitute different latitudes in the vector. A weight corresponding to each latitude is calculated according to the word frequency of the word using formula (5):

$$P_{S_u(w)} = \frac{C_{S_u(w)}}{\sum w \in C_{S_u}(w)} \qquad (5)$$

where $C_s$ represents word frequency information in the input habit information keyword set. The formula (5) is a normalized weight calculation method, with a calculation result falling within a [0, 1] interval. Such values are combined to constitute a vector of the input habit information keyword set. That is:

$$P_{S_u} = \{P_{S_u}(w_1), P_{S_u}(w_2), \ldots, P_{S_u}(w_n)\} \qquad (6)$$

Similarly, the word frequency information in the thesaurus information keyword set is obtained, that is, $$P_{S_d} = \{P_{S_d}(w_1), P_{S_d}(w_2), \ldots, P_{S_d}(w_n)\} \qquad (7).$$

The similarity between the input habit information keyword set and the thesaurus information keyword set is a cosine angle between the above two vectors, and is calculated through formula (8):

$$L_{ud} = \frac{\sum_{w \in S_u \cup S_d} \{P_{S_u}(w) * P_{S_d}(w)\}}{\sqrt[2]{\sum_{w \in S_u} \left\{P_{S_u}(w)\right\}} * \sqrt[2]{\sum_{w \in S_d} P_{S_d}(w)}} \qquad (8)$$

Calculating similarity between the input habit information keyword set and the thesaurus information keyword set is a double traversal process, which refers to calculating similarity for each input habit information keyword in the input habit information keyword set and each thesaurus information keyword in the thesaurus information keyword set to find the matching thesaurus.

Thesaurus Sorter

In a thesaurus set, many thesauruses may be determined as matching the personal information of the user. If all matching thesauruses are sent to the terminal currently used by the user, it will occupy too much bandwidth of the Internet. In addition, after the user installs all matching thesauruses on the terminal currently used by the user, the user makes an input and all matching thesauruses have to be invoked one by one, which results in slowing down the running speed of the computer. Therefore, in the present invention, the matching thesauruses need to be sorted, and a set number of thesauruses which have highest matching degree are selected to make up a list of thesauruses, and the thesauruses in the list of thesauruses are sent to the terminal currently used by the user.

In the embodiment of the present invention, a sorting rule set in the thesaurus sorter is based on the following principles:

The first principle is: a priority of a thesaurus recommended by the rule-based thesaurus recommender is higher than a priority of a thesaurus recommended by a content-based thesaurus recommender.

Because the thesaurus recommended by the rule-based thesaurus recommender is more accurate, the priority of the thesauruses obtained from the rule-based thesaurus recommender is higher than the priority of the thesaurus recommended by the content-based thesaurus recommender.

The second principle is: a priority of a matching thesaurus having a smaller entry capacity is higher than a priority of a matching thesaurus having a larger entry capacity.

Due to the smaller entry capacity, i.e., fewer word entries, the thesaurus has more centralized content and clearer topic, and therefore, the thesaurus is more specific to a particular application field and has a priority level higher than the priority of the thesaurus having a larger entry capacity.

The third principle is: information on thesauruses already installed on the terminal currently used by the user is obtained, and the thesauruses already installed on the terminal currently used by the user are excluded from the list of thesauruses.

In the present invention, the obtained list of thesauruses is sent to the terminal currently used by the user so that the thesauruses are available for being installed on the terminal currently used by the user, where the sending may be periodical. When the list of thesauruses is obtained, the number of thesauruses in the list may be changed by the terminal currently used by the user as required, and is not limited here.

Figure 5:
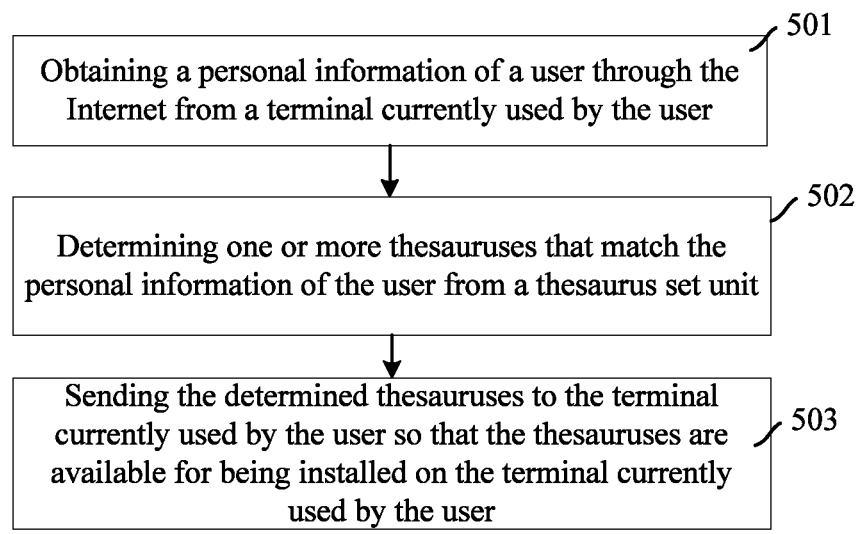
FIG. 5 is a flowchart of a method for recommending a thesaurus in an input method according to an embodiment of the present invention.

FIG. 5 is a flowchart of a method for recommending a thesaurus in an input method according to an embodiment of the present invention. The detailed steps of the method are as follows:

Step 501: obtaining a personal information of a user through the Internet from a terminal currently used by the user.

Step 502: determining one or more thesauruses that match the personal information of the user from a thesaurus set unit.

Step 503: sending the determined thesauruses to the terminal currently used by the user so that the thesauruses are available for being installed on the terminal currently used by the user.

In the method, before step 503, the method further includes:

under a condition that there are at least two determined thesauruses that match the personal information of the user, sorting the determined thesauruses to obtain a list of thesauruses, and sending thesauruses in the list of thesauruses to the terminal currently used by the user.

In the method, the personal information of the user includes: current registration information, current status information and input habit information of the user, where the current registration information and the current status information are obtained through the Internet from the terminal currently used by the user, and the input habit information is obtained from a personal thesaurus of the user. The personal thesaurus of the user stores word entries that are input by the user by using the input method.

When the personal information of the user is the current registration information and the current status information of the user, the process of determining the one or more thesaurus that matches the personal information of the user includes:

obtaining a user information description text according to the current registration information and the current status information, and obtaining a thesaurus information description text stored in the thesaurus set unit from the thesaurus set unit;

segmenting words in the user information description text, filter out stop words, and form a user information keyword set; segmenting words in the thesaurus information description text, filter out stop words, and form a thesaurus information keyword set; and calculating similarity between the user information keyword set and the thesaurus information keyword set; and, if the similarity between a user information keyword in the user information keyword set and a thesaurus information keyword in the thesaurus information keyword set is greater than a set first similarity threshold, determining that a thesaurus corresponding to the thesaurus information keyword is the thesaurus which matches the personal information of the user.

Specifically, the similarity is calculated using formula (1).

When the personal information of the user is the input habit information of the user, the process of determining the one or more thesauruses that match the personal information of the user includes:

obtaining an input habit information description text according to the input habit information, and obtain a thesaurus information description text stored in the thesaurus set unit from the thesaurus set unit;

segmenting words in the input habit information description text, filter out stop words, and form an input habit information keyword set; segmenting words in the thesaurus information description text, filter out stop words, and form a thesaurus information keyword set; and calculating a similarity between the input habit information keyword set and the thesaurus information keyword set; and, if the similarity between an input habit information keyword in the input habit information keyword set and a thesaurus information keyword in the thesaurus information keyword set is greater than a set second similarity threshold, determining that a thesaurus corresponding to the thesaurus information keyword is the thesaurus which matches the personal information of the user.

The similarity is calculated using formula (1), formula (2), or formula (8).

As revealed in the embodiments of the present invention, the present invention automatically recommends, installs and loads thesauruses pertinent to a user according to personal preferences of the user so as to improve the user input experience. The method is further applicable to applications such as speech recognition, handwriting recognition, and optical character recognition.

Further, an embodiment of the present invention provides a device for recommending a thesaurus in an input method. The device includes: a memory, configured to store instructions; and a processor, coupled with the memory. The processor is configured to execute the instructions stored in the memory, and is configured to execute various implementation modes of the foregoing method for recommending a thesaurus in an input method. Further, an embodiment of the present invention provides a machine-readable medium, which stores an instruction set. When the instruction set is executed, the machine may execute various implementation modes of the foregoing method for recommending a thesaurus in an input method.

The foregoing descriptions are merely preferred embodiments of the present invention, but are not intended to limit the protection scope of the present invention. Any modifications, equivalent substitutions, and improvements made within the spirit and principles of the present invention shall fall within the protection scope of the present invention.

The invention claimed is:

1. A system for recommending a thesaurus in an input method, comprising:
a network side device; and
a terminal currently used by a user,
wherein the network side device comprises:
a memory;
one or more processors; and
having code stored therein, when the one or more processors execute the code the one or more processors are configured into a plurality of units comprising a thesaurus set unit and a thesaurus selecting unit; and
wherein the thesaurus set unit is configured to store multiple different thesauruses;
the thesaurus selecting unit is configured to obtain personal information of the user through the internet from the terminal currently used by the user, determine one or more thesauruses which match the personal information of the user from the thesaurus set unit, and send the determined thesauruses to the terminal currently used by the user so that the thesauruses are available for being installed on the terminal currently used by the user;
the terminal currently used by the user is configured to store the personal information of the user, and install the thesauruses sent from the thesaurus selecting unit;
the thesaurus selecting unit comprises a rule-based thesaurus recommender configured to determine one or more thesauruses which match the personal information of the user from the thesaurus set unit according to current registration information of the user and current status information of the user that are obtained through the internet from the terminal currently used by the user, and send the determined thesauruses to the thesaurus sorter;
the rule-based thesaurus recommender comprises a first information getter, a first segmentation and filter, and a first similarity calculator;
the first information getter is configured to obtain the current registration information and the current status information of the user through the internet from the terminal currently used by the user to obtain a user information description text, and send the user information description text to the first segmentation and filter; and obtain a thesaurus information description text stored in the thesaurus set unit from the thesaurus set unit, and send the thesaurus information description text to the first segmentation and filter;
the first segmentation and filter is configured to segment words in the user information description text, filter out stop words, form a user information keyword set, and send the user information keyword set to the first similarity calculator; segment words in the thesaurus information description text, filter out stop words, form a thesaurus information keyword set, and send the thesaurus information keyword set to the first similarity calculator; and
the first similarity calculator is configured to: calculate similarity between the user information keyword set and the thesaurus information keyword set; and, if the similarity between a user information keyword in the user information keyword set and a thesaurus information keyword in the thesaurus information keyword set is greater than a set first similarity threshold, determine that a thesaurus corresponding to the thesaurus information keyword is the thesaurus which matches the personal information of the user.

2. The system according to claim 1, wherein:
the thesaurus selecting unit is further configured to: before the determined thesaurus is sent to the terminal currently used by the user, under a condition that there are at least two determined thesauruses that match the personal information of the user, sort the determined thesauruses to obtain a list of thesauruses, and send thesauruses in the list of thesauruses to the terminal currently used by the user.

3. The system according to claim 2, wherein:
the thesaurus selecting unit further comprises: a content-based thesaurus recommender, and a thesaurus sorter;
the content-based thesaurus recommender is configured to determine one or more thesauruses which match the personal information of the user from the thesaurus set unit according to input habit information of the user obtained from a personal thesaurus of the user, and send the determined thesauruses to the thesaurus sorter; and
the thesaurus sorter is configured to receive the determined thesauruses sent from the rule-based thesaurus recommender and the content-based thesaurus recommender, respectively, sort the thesauruses according to set rules to obtain a list of thesauruses, and send thesauruses in the list of thesauruses to the terminal currently used by the user.

4. An apparatus for recommending a thesaurus in an input method, comprising:
a memory;
one or more processors; and
the memory having code stored therein, when the one or more processors execute the code the one or more processors are configured to comprises a rule-based thesaurus recommender, a content-based thesaurus recommender, and a thesaurus sorter; wherein the rule-based thesaurus recommender is configured to determine one or more thesauruses which match personal information of a user from a thesaurus set unit according to current registration information of the user and current status information of the user that are obtained through the internet from a terminal currently used by the user, and send the determined thesauruses to the thesaurus sorter;

the content-based thesaurus recommender is configured to determine one or more thesauruses which match the personal information of the user from the thesaurus set unit according to input habit information of the user obtained from a personal thesaurus of the user, and send the determined thesauruses to the thesaurus sorter;

the thesaurus sorter is configured to receive the determined thesauruses sent from the rule-based thesaurus recommender and the content-based thesaurus recommender, respectively, sort the thesauruses according to set rules to obtain a list of thesauruses, and send thesauruses in the list of thesauruses to the terminal currently used by the user;

the rule-based thesaurus recommender comprises a first information getter, a first segmentation and filter, and a first similarity calculator;

the first information getter is configured to obtain the current registration information and the current status information of the user through the internet from the terminal currently used by the user to obtain a user information description text, and send the user information description text to the first segmentation and filter; and obtain a thesaurus information description text stored in the thesaurus set unit from the thesaurus set unit, and send the thesaurus information description text to the first segmentation and filter;

the first segmentation and filter is configured to segment words in the user information description text, filter out stop words, form a user information keyword set, and send the user information keyword set to the first similarity calculator; segment words in the thesaurus information description text, filter out stop words, form a thesaurus information keyword set, and send the thesaurus information keyword set to the first similarity calculator; and the first similarity calculator is configured to: calculate similarity between the user information keyword set and the thesaurus information keyword set; and, if the similarity between a user information keyword in the user information keyword set and a thesaurus information keyword in the thesaurus information keyword set is greater than a set first similarity threshold, determine that a thesaurus corresponding to the thesaurus information keyword is the thesaurus which matches the personal information of the user.

5. The apparatus according to claim 4, wherein:

the content-based thesaurus recommender comprises a second information getter, a second segmentation and filter, and a second similarity calculator;

the second information getter is configured to obtain the input habit information from the personal thesaurus of the user, and send the input habit information to the second segmentation and filter; and obtain a thesaurus information description text stored in the thesaurus set unit from the thesaurus set unit, and send the thesaurus information description text to the second segmentation and filter;

the second segmentation and filter is configured to segment words in the input habit information, filter out stop words, form an input habit information keyword set, and send the input habit information keyword set to the second similarity calculator; segment words in the thesaurus information description text, filter out stop words, form a thesaurus information keyword set, and send the thesaurus information keyword set to the second similarity calculator; and the second similarity calculator is configured to: calculate similarity between the input habit information keyword set and the thesaurus information keyword set; and, if the similarity between an input habit information keyword in the input habit information keyword set and a thesaurus information keyword in the thesaurus information keyword set is greater than a set second similarity threshold, determine that a thesaurus corresponding to the thesaurus information keyword is the thesaurus which matches the personal information of the user.

6. A method for recommending a thesaurus in an input method, comprising:

obtaining personal information of a user through the internet from a terminal currently used by the user;

determining one or more thesauruses which match the personal information of the user from a thesaurus set unit;

sending the determined thesauruses to the terminal currently used by the user so that the thesauruses are available for being installed on the terminal currently used by the user, wherein the personal information of the user comprises current registration information and current status information, and the process of determining the one or more thesauruses which match the personal information of the user comprises:

obtaining a user information description text according to the current registration information and the current status information, and obtaining a thesaurus information description text stored in the thesaurus set unit from the thesaurus set unit;

segmenting words in the user information description text, filtering out stop words, and forming a user information keyword set; segmenting words in the thesaurus information description text, filtering out stop words, and forming a thesaurus information keyword set; and calculating similarity between the user information keyword set and the thesaurus information keyword set; and, if the similarity between a user information keyword in the user information keyword set and a thesaurus information keyword in the thesaurus information keyword set is greater than a set first similarity threshold, determining that a thesaurus corresponding to the thesaurus information keyword is the thesaurus which matches the personal information of the user.

7. The method according to claim 6, wherein:

before sending the determined thesauruses to the terminal currently used by the user, the method further comprises:

under a condition that there are at least two determined thesauruses that match the personal information of the user, sorting the determined thesauruses to obtain a list of thesauruses, and sending thesauruses in the list of thesauruses to the terminal currently used by the user.

8. The method according to claim 7, wherein:
the personal information of the user further comprises input habit information of the user, wherein the current registration information and the current status information are obtained through the internet from the terminal currently used by the user, the input habit information is obtained from a personal thesaurus of the user, and the personal thesaurus of the user stores word entries that are input by the user by using the input method.

9. The method according to claim 8, wherein:
the process of determining the one or more thesaurus that match the personal information of the user further comprises:
obtaining an input habit information description text according to the input habit information, and obtaining a further thesaurus information description text stored in the thesaurus set unit from the thesaurus set unit;
segmenting words in the input habit information description text, filtering out stop words, and forming an input habit information keyword set; segmenting words in the further thesaurus information description text, filtering out stop words, and forming a further thesaurus information keyword set; and
calculating a similarity between the input habit information keyword set and the further thesaurus information keyword set; and, if the similarity between an input habit information keyword in the input habit information keyword set and a thesaurus information keyword in the further thesaurus information keyword set is greater than a set second similarity threshold, determining that a thesaurus corresponding to the thesaurus information keyword in the further thesaurus information keyword set is the thesaurus which matches the personal information of the user.

10. The method according to claim 9, wherein:
the calculated similarity between the input habit information keyword set and the further thesaurus information keyword set is a ratio of a total word frequency in an intersection to a total word frequency in a union, wherein the intersection is an intersection of the input habit information keyword set and the further thesaurus information keyword set, and the union is a union of the input habit information keyword set and the further thesaurus information keyword set; or
the calculated similarity is a value of a cosine angle between a vector of the input habit information keyword set and a vector of the further thesaurus information keyword set.

11. The method according to claim 6, wherein:
the similarity between the user information keyword set and the thesaurus information keyword set is a ratio of an intersection to a union, wherein the intersection is an intersection of the user information keyword set and the thesaurus information keyword set, and the union is a union of the user information keyword set and the thesaurus information keyword set.

* * * * *